United States Patent [19]
Thompson et al.

[11] 4,344,977
[45] * Aug. 17, 1982

[54] **SMOKED FISH PRODUCTS WHICH INHIBIT THE GROWTH OF *CLOSTRIDIUM BOTULINUM* AND THE FORMATION OF ENTEROTOXIN**

[75] Inventors: John S. Thompson, Wayne, Pa.; Joseph F. Jadlocki, Jr., Mount Holly, N.J.

[73] Assignee: FMC Corporation, Philadelphia, Pa.

[*] Notice: The portion of the term of this patent subsequent to Jul. 7, 1998, has been disclaimed.

[21] Appl. No.: 275,580

[22] Filed: Jun. 22, 1981

Related U.S. Application Data

[60] Division of Ser. No. 184,689, Sep. 8, 1980, Pat. No. 4,227,507, which is a continuation-in-part of Ser. No. 140,328, Apr. 14, 1980, Pat. No. 4,282,260.

[51] Int. Cl.³ .................. A23B 4/02; A23L 1/325
[52] U.S. Cl. ............................ 426/532; 426/643; 426/652
[58] Field of Search ............... 426/264, 315, 332, 335, 426/331, 532, 641, 643, 266, 652

[56] References Cited

U.S. PATENT DOCUMENTS

| | | |
|---|---|---|
| 1,687,270 | 10/1928 | Epstein . |
| 1,911,009 | 5/1933 | Woidich ............................ 426/332 |
| 3,003,883 | 10/1961 | Levy . |
| 3,220,854 | 11/1965 | Zwart ............................ 426/315 X |
| 3,258,345 | 6/1966 | Schach et al. |
| 3,359,121 | 12/1967 | Bard et al. ...................... 426/315 X |
| 3,545,982 | 12/1970 | Nakatani et al. |
| 3,595,679 | 7/1971 | Schoch et al. .................. 426/315 X |
| 3,792,177 | 2/1974 | Nakatani et al. |
| 3,901,981 | 8/1975 | Draudt ............................ 426/315 X |

FOREIGN PATENT DOCUMENTS

| | | | |
|---|---|---|---|
| 2713259 | 9/1977 | Fed. Rep. of Germany ...... 426/264 |
| 7709108 | 3/1977 | France . | |
| 31223 | 11/1933 | Netherlands ...................... 426/266 |
| 50538 | 4/1932 | Norway ............................ 426/266 |

OTHER PUBLICATIONS

O'Brien, "USDA Acts on the Bacon Dilemma," Food Product Development, pp. 32–37, 7-1978.
Ranieri, "Nitrite Update: Search Intensifies for Bacon Curing Alternatives," Food Product Development, pp. 28 and 30, 10-1979.
Andres, "Starter Culture Reduces Residual Nitrite in Bacon," Food Processing, pp. 56–58, 5-1979.
Data Sheet No. 806A, Industrial Chemicals Division, Hooker Chemical Corp., Niagara Falls, N.Y., 14302.

*Primary Examiner*—Arthur L. Corbin
*Attorney, Agent, or Firm*—Frank Ianno; Eugene G. Seems

[57] ABSTRACT

A smoked fish product, which inhibits the growth of *Clostridium botulinum* and the production of enterotoxin during storage of the smoked fish, containing an alkali metal nitrite salt and a compound selected from the group consisting of hypophosphorous acid and sodium, potassium, calcium, and manganese salts thereof.

7 Claims, No Drawings

SMOKED FISH PRODUCTS WHICH INHIBIT THE GROWTH OF *CLOSTRIDIUM BOTULINUM* AND THE FORMATION OF ENTEROTOXIN

This application is a division of application Ser. No. 184,689, filed Sept. 8, 1980, now U.S. Pat. No. 4,227,507, which application is a continuation-in-part of copending application Ser. No. 140,328, filed Apr. 14, 1980, now U.S. Pat. No. 4,282,260.

This invention relates to a composition which inhibits the growth of *Clostridium botulinum* in preserved meat and fish products that have been smoked. For many years, it has been standard practice to add sodium nitrite to preserve meat products such as ham, bacon, and other meats, e.g., frankfurters, baloney, Thuringian sausages and salami, having a small particle size. The sodium nitrite is added to inhibit the growth of *Clostridium botulinum* and the production of enterotoxin in the smoked meat products during storage. The addition of sodium nitrite also maintains a pleasing pink color in the meat.

The presence of sodium nitrite as a food additive, and particularly the presence of sodium nitrite in bacon and other smoked meats that are cooked at high temperatures, has become of increasing concern with the knowledge that sodium nitrite can combine with secondary and tertiary amines in cooked meats (particularly bacon) to form nitrosamines. Many nitrosamines have been shown to be carcinogens in animals, and the nitrosamine that is commonly found in fried bacon, nitrosopyrrolidine, is a known carcinogen.

It is quite obvious that reducing the nitrites present in smoked meat and fish is a desirable goal, but it is also necessary to prevent the production of deadly botulinal toxin that may occur on storage. Because of the widespread concern with the use, toxicity and necessity of nitrite addition in food products, this problem has received increasing attention. French patent application No. 7709108 reduces the amount of sodium nitrite by substituting for a part of it large amounts of sorbic acid and its salts. This combination of additives has the disadvantage that some persons of the population have developed allergic reactions after eating nitrite/sorbate-smoked products.

Another approach to solving the N-nitrosamine problem is the addition of materials to suppress N-nitrosamine formation. A cooperative American Meat Institute study, which involved eight firms using their commercial production techniques, indicated that in commercial production, α-tocopherol in combination with sodium erythorbate (isoascorbate) or sodium ascorbate did suppress N-nitrosamine formation. Dispersion of the α-tocopherol in the pickle was occasionally a problem, and a surface active agent was mixed with the α-tocopherol to improve dispersion. The lowest level of nitrosopyrrolidine (0.4 to 2 parts per million) was obtained with 120 parts per million nitrite, 550 parts per million erythorbate or ascorbate and 550 parts per million α-tocopherol.

Since June 15, 1978 the U.S. Department of Agriculture has required that all bacon produced using nitrite must employ 120 parts per million of sodium nitrite (or 148 parts per million of potassium nitrite) to prevent formation of botulinal toxin and 550 parts per million sodium ascorbate or sodium erythorbate to inhibit formation of nitrosamines.

More recently, the U.S. Department of Agriculture has approved a bacon process using a blend of microorganisms (lactobacilli) that is incorporated in the curing pickle to promote production of lactic acid and reduce potential nitrosamine formation. During smoking, the culture reduces the pH of the meat, which, in turn, reduces the residual nitrite content in the final product. Both factors, lower pH and reduced residual nitrite content, reduce subsequent nitrosamine formation at the time of frying. The current levels of 120 parts per million sodium nitrite and 550 parts per million sodium erythorbate (isoascorbate) are still employed in the process.

It is an object of the present invention to provide an alternative to the present technique of preserving meats and fish whereby the growth of *Clostridium botulinum* and production of enterotoxin during storage is inhibited, while at the same time, reducing or eliminating entirely the amount of sodium nitrite that is added.

It is another object of the present invention to inhibit the formation of N-nitrosamines that may be formed upon cooking meat and fish products which contain sodium nitrite by the addition thereto of hypophosphorous acid and/or salts of hypophosphorus acid.

In accordance with the present invention, the growth of *Clostridium botulinum* and the production of botulinal toxin is inhibited during storage of smoked meat and fish products by addition thereto of an effective amount of a compound selected from the group consisting of hypophosphorous acid, sodium hypophosphite, potassium hypophosphite, calcium hypophosphite and manganese hypophosphite. Sodium hypophosphite is conveniently used in the form of its monohydrate, $NaH_2PO_2 \cdot H_2O$. The amount (120 ppm) of sodium nitrite that is customarily added to such meat and fish products may be reduced to one-third of that amount or eliminated entirely. The addition of hypophosphorous acid and/or a salt of hypophosphorous acid is believed to suppress or block the formation of N-nitrosamines upon cooking smoked meat and fish product containing sodium nitrite.

The amount of hypophosphite salt (or hypophosphorous acid) that is added may vary with the meat product, the particular salt and the presence or absence of sodium nitrite; and desirably is about 1,000–3,000 parts per million. It is preferred that about 3,000 parts per million of hypophosphite salt be added if all sodium nitrite is eliminated from the meat or fish product. About 1,000 parts per million of sodium hypophosphite is effective when 40 parts per million of sodium nitrite is also present in the meat composition. As indicated above, the potassium and calcium or manganese hypophosphite salts may be employed in similar amounts with good results. The choice of a particular hypophosphite salt will depend upon its cost and relative effectiveness.

In the practice of the present invention, the hypophosphorous acid (or its salt) may be added to the pickle (in solution or solid form) and can be added to the meat with the pickle or rubbed into the meat or fish after smoking. while hypophosphorous acid and its salts can be added to smoke cured meat products that are ground or chopped into small particle size, e.g., frankfurters, it is of particular advantage when added to meat products such as ham and bacon either before or after smoking, as bacon in particular has the potential of forming nitrosamines if cooked in the presence of substantial amounts of sodium nitrite.

The invention is further illustrated by the following examples which should not be considered as limitative of its scope. Temperatures are in degrees centigrade and quantities are expressed in parts by weight and parts per million (ppm) unless otherwise indicated.

EXAMPLE I

The effect of variable quantities of sodium nitrite and sodium hypophosphite on the pH, color and odor of ground pork before and after heating to 55° C. is determined by placing in each of 11 beakers, 99 grams of ground pork (fresh boneless pork hams). The cure ingredients are dissolved in 10 ml of water and adjusted to provide 1.5% sodium chloride, 0.3% CURAFOS (a curing agent manufactured by the Stauffer Chemical Company, Westport, Conn. 06880, and consisting of a blend of sodium tripolyphosphate and sodium hexametaphosphate) and 550 ppm sodium erythorbate (based on the weight of ground pork in each beaker). From 0 to 120 parts per million of sodium nitrite and from 0 to 4,000 parts per million of sodium hypophosphite are then added to the 11 beakers and the meat product in each beaker is mixed with the curing agent and additives. The quantities of sodium nitrite and sodium hypophosphite added to each of the 11 beakers is indicated in Table I (samples 1-11).

The color, odor and pH of the meat is noted with respect to each of the 11 samples. The beakers are covered with aluminum foil and heated in a water bath at 55° C. for 7 hours. After heating, the color, odor and pH of the meat in each beaker is again recorded. The results are summarized in Table I. It will be noted from Table I that the addition of sodium hypophosphite to ground pork at levels of 1,000-4,000 ppm has no adverse effect on pH, color or odor.

EXAMPLE II

A. Example I above is repeated using 57.5 gram samples of ground pork in each of 9 beakers; and adjusting the 10 ml solutions of curing agent to provide 0.1% sucrose, 2.0% sodium chloride, 0.3% CURAFOS and 550 ppm sodium erythorbate (based on the weight of the pork). The quantities of sodium nitrite and sodium hypophosphite added to each of the 9 beakers is indicated in Table II (samples 1-9). The pH of the meat in each sample is noted; the beakers are covered with aluminum foil and heated in a water bath at 55° C. for 6 hours. The pH of the meat in each beaker is again recorded after heating. The effect of varying the quantities of sodium nitrite and sodium hypophosphite on the meat samples is shown in Table II (column A).

B. Example II(A) above is repeated as described in the preceding paragraph except that 55.5 grams of ground pork (containing 30% fat) is substituted for the fresh boneless pork hams used in Examples I and II(A). The effect on pH of varying the amounts of sodium nitrite and sodium hypophosphite before and after heating is shown in Table II (column B).

It will be noted from Table II that within the variation and amounts of sodium hypophosphite investigated, there is no appreciable affect on the pH of the meat.

EXAMPLE III

This experiment was designed to test for botulinum toxin in unswollen packages of bacon (9 different bacon samples that have been treated with various quantities of sodium nitrite and sodium hypophosphite), after 4, 7, 10, 14, 25 and 56 days storage at 25° C. Four packages of each bacon sample were prepared to be tested after each storage interval. However, those packages that swelled were not tested. Moreover, at the time that all packages of a particular bacon sample had swollen, toxin tests on that sample were terminated.

Each of the 9 bacon samples weighs approximately 33 pounds and is manufactured in a commercial meat processing plant. A conventional pickle solution (550 ppm sodium erythorbate, 0.3% sodium tripolyphosphate, 1.5% sodium chloride and 0.11% sucrose [based on meat weight]) is used. The pickle solutions that are used to prepare each of the 9 different bacon samples differed, however, in the quantities of sodium nitrite and sodium hypophosphite, added. The pickle solutions are pumped into 10-12 pound pork bellies to get approximately a 13% weight gain. After pumping, the bellies are smoked for 7 hours to an internal temperature of 53° C. The average yield after smoking is about 101%. The calculated amount of each ingredient that is designed to be present in each sample of smoked bacon is shown in Table III. Sample 9 (containing 120 ppm sodium nitrite and no sodium hypophosphite) is representative of bacon that is currently marketed. This sample is included as the sample for comparison since it represents the U.S. Department of Agriculture's required level of sodium nitrite in bacon.

The cured smoked bellies are cooled, sliced and each of the bacon samples are analyzed (random one-half pound samples) for pH, fat, protein, salt, moisture and sodium nitrite according to Association of Official Analytical Chemists procedures. These data are summarized in Table IV.

Slices of bacon for testing are randomly picked from the 9 sliced bacon samples. The slices are uniformly inoculated (0.25 ml for 100 grams of bacon) with a heat-shocked suspension of *Clostridium botulinum* spores. The inoculum consists of 4 type A strains and 5 types B strains (36A, 52A, 77A, 10755A, ATCC 7949, 41B, 53B, 213B and Lamanna B). The average inoculum level is between 100 and 500 spores per gram of bacon. Twenty-eight vacuum packages (100 grams of bacon per package) of inoculated bacon is prepared for each of the 9 bacon samples. Four packages from each sample are examined immediately for toxicity, *Clostridium botulinum*, (heat shocked and unheated). The results are summarized in Table V.

The remaining 24 packages of each sample are incubated at 27° C. and tested for botulinum toxin after 0, 7, 10, 14, 24 and 56 days storage.

Procedures for assay samples for *Clostridium botulinum toxin are the same as those reported by Christiansen et al.* (1974 Appl. Microbiol. 27:733-737); except that samples are homogenized prior to testing, and toxicity of the supernatant fluid is determined immediately by injecting 2 mice with heated fluid and 3 mice with unheated fluid. The results of this experiment are summarized in Table VI, which shows in each column the number of packages found to be toxic over the number of packages tested. With respect to each bacon sample, the test is terminated when all of the packages remaining in storage become swollen. It will be noted from Table VI that toxins were found in packages that had not swollen (7-14 days storage). Samples containing 40 ppm sodium nitrite plus 1,000-3,000 ppm sodium hypophosphite showed a delay in onset of toxin formation in comparison to bacon containing only 40 ppm of sodium nitrite. These samples were also superior during storage to the control sample 9 (120 ppm sodium nitrite).

EXAMPLE IV

Example III above is repeated in that 25 packages of each of the 9 bacon samples (inoculated with *Clostridium botulinum* as described above in Example III) are incubated at 27° C. and tested for toxicity at various intervals when the package becomes swollen. The cumulative number of packages that swell and the number of the swollen packages that are found to be toxic are summarized for days 9 through 49 in Table VII.

The combined results (days elapsed to first detection of toxin) for the 9 inoculated samples as determined from Examples III and IV are summarized in Table VIII. It is noted from Table VIII that the samples containing 40 ppm sodium nitrite and 1,000 and 3,000 ppm sodium hypophosphite and only 3,000 ppm sodium hypophosphite showed a longer delay in onset of toxin formation in comparison to bacon containing only 120 ppm of sodium nitrite.

EXAMPLE V

Ten packages of bacon (100 grams each of uninoculated bacon), prepared from the 9 bacon samples produced in accordance with Example III and having the composition indicated in Table IV, are incubated at 27° C. for various periods of time. The cumulative number of packages that swell and the storage time prior to the occurrence of swelling is summarized in Table IX.

EXAMPLE VI

In a manner similar to that described above in Example III, fresh salmon may be steeped in a pickle solution containing 1.8 kilograms of salt, 680 grams of sugar, 16 grams of saltpeter and 454 grams of sodium hypophosphite dissolved in 22.7 liters of water. After 12 hours, the fish is removed from the pickle solution washed under running water and smoked for 5 hours to an internal temperature of 80° C. The smoked salmon may be stored over a substantial period of time without spoilage.

TABLE I

Color, Odor, and pH of Ground Pork Before and After Heating at 55° C. for 7 Hours. Trial 1.

| Sample | Before Heating | | | After Heating | | |
|---|---|---|---|---|---|---|
| | pH | Color | Odor | pH | Color | Odor |
| 1 | 5.81 | pale pink | no off odors | 6.10 | tan | no off odors |
| 2 | 5.80 | pale pink | " | 6.15 | " | " |
| 3 | 5.86 | pale pink | " | 6.14 | " | " |
| 4 | 5.83 | pale pink | " | 6.13 | " | " |
| 5 | 5.80 | pale pink | " | 6.12 | " | " |
| 6 | 5.81 | tan | " | 6.16 | pink | " |
| 7 | 5.80 | " | " | 6.06 | " | " |
| 8 | 5.83 | " | " | 6.04 | " | " |
| 9 | 5.84 | " | " | 6.04 | " | " |
| 10 | 5.81 | " | " | 6.03 | " | " |
| 11 | 5.82 | " | " | 6.06 | " | " |

Sample 1 contains neither sodium nor sodium hypophosphite.
Sample 2 contains no sodium nitrite and 1,000 ppm sodium hypophosphite.
Sample 3 contains no sodium nitrite and 2,000 ppm sodium hypophosphite.
Sample 4 contains no sodium nitrite and 3,000 ppm sodium hypophosphite.
Sample 5 contains no sodium nitrite and 4,000 ppm sodium hypophosphite.
Sample 6 contains 40 ppm sodium nitrite and no sodium hypophosphite.
Sample 7 contains 40 ppm sodium nitrite and 1,000 ppm sodium hypophosphite.
Sample 8 contains 40 ppm sodium nitrite and 2,000 ppm sodium hypophosphite.
Sample 9 contains 40 ppm sodium nitrite and 3,000 ppm sodium hypophosphite.
Sample 10 contains 40 ppm sodium nitrite and 4,000 ppm sodium hypophosphite.
Sample 11 contains 120 ppm sodium nitrite and no sodium hypophosphite.

TABLE II pH of Ground Pork Before and After Heating at 55° C. for 6 Hours. Trial 2 and 3.

| Sample | Before Heating - pH | | After Heating - pH | |
|---|---|---|---|---|
| | A | B | A | B |
| 1 | 5.72 | 5.79 | 5.94 | 5.95 |
| 2 | 5.72 | 5.76 | 5.93 | 5.98 |
| 3 | 5.70 | 5.80 | 5.92 | 5.99 |
| 4 | 5.71 | 5.78 | 5.92 | 5.97 |
| 5 | 5.72 | 5.80 | 5.94 | 5.99 |
| 6 | 5.71 | 5.81 | 5.95 | 5.98 |
| 7 | 5.71 | 5.80 | 5.94 | 6.02 |
| 8 | 5.72 | 5.81 | 5.95 | 6.00 |
| 9 | 5.72 | 5.81 | 5.94 | 6.01 |

Sample contains neither sodium nitrite nor sodium hypophosphite.
Sample 2 contains no sodium nitrite and 1,000 ppm sodium hypophosphite.
Sample 3 contains no sodium nitrite and 2,000 ppm sodium hypophosphite.
Sample 4 contains no sodium nitrite and 4,000 ppm sodium hypophosphite.
Sample 5 contains 40 ppm sodium nitrite and no sodium hypophosphite.
Sample 6 contains 40 ppm sodium nitrite and 1,000 ppm sodium hypophosphite.
Sample 7 contains 40 ppm sodium nitrite and 2,000 ppm sodium hypophosphite.
Sample 8 contains 40 ppm sodium nitrite and 4,000 ppm sodium hypophosphite.
Sample 9 contains 120 ppm sodium nitrite and no sodium hypophosphite.

TABLE III

Desired Concentration of Ingredients in Finished Bacon

| Sample | Sodium Nitrite (ppm) | Sodium Hypophosphite (ppm) | Sodium Erythorbate (ppm) | Sodium Tripolyphosphate (%) | Sodium Chloride (%) | Sucrose (%) |
|---|---|---|---|---|---|---|
| 1 | 0 | 0 | 550 | 0.3 | 1.5 | 0.11 |
| 2 | 0 | 500 | 550 | 0.3 | 1.5 | 0.11 |
| 3 | 0 | 1000 | 550 | 0.3 | 1.5 | 0.11 |
| 4 | 0 | 3000 | 550 | 0.3 | 1.5 | 0.11 |
| 5 | 40 | 0 | 550 | 0.3 | 1.5 | 0.11 |
| 6 | 40 | 500 | 550 | 0.3 | 1.5 | 0.11 |
| 7 | 40 | 1000 | 550 | 0.3 | 1.5 | 0.11 |
| 8 | 40 | 3000 | 550 | 0.3 | 1.5 | 0.11 |
| 9 | 120 | 0 | 550 | 0.3 | 1.5 | 0.11 |

TABLE IV

Chemical Analysis of Bacon

| Sample | Fat (%) | Protein (%) | Moisture (%) | Salt (%) | Brine (%) | NaNO$_2$ (ppm) | pH |
|---|---|---|---|---|---|---|---|
| 1 | 56 | 8.2 | 33 | 1.7 | 4.9 | <1 | 6.70 |
| 2 | 56 | 7.9 | 34 | 1.8 | 5.1 | <1 | 6.40 |
| 3 | 62 | 7.2 | 29 | 1.8 | 5.9 | 2 | 6.58 |
| 4 | 56 | 8.5 | 33 | 1.7 | 4.8 | 2 | 6.53 |
| 5 | 59 | 7.8 | 31 | 1.6 | 5.1 | 7 | 6.54 |
| 6 | 59 | 8.2 | 30 | 1.5 | 4.7 | 13 | 6.63 |
| 7 | 50 | 9.2 | 38 | 2.0 | 5.0 | 10 | 6.43 |
| 8 | 58 | 8.2 | 30 | 1.6 | 4.9 | 8 | 6.39 |
| 9 | 60 | 7.6 | 30 | 1.6 | 4.9 | 37 | 6.58 |

TABLE V

Clostridium botulinum Counts of Inoculated Bacon
C.botulinum/gm

| Sample | Sodium Nitrite (ppm) | Sodium Hypophosphite (ppm) | Heat-shocked[a] | Unheated |
|---|---|---|---|---|
| 1 | 0 | 0 | 150 | 280 |
| 2 | 0 | 500 | 45 | 280 |
| 3 | 0 | 1000 | 720 | 720 |
| 4 | 0 | 3000 | 130 | 130 |
| 5 | 40 | 0 | 230 | 280 |
| 6 | 40 | 500 | 3300 | 1400 |
| 7 | 40 | 1000 | 720 | 280 |
| 8 | 40 | 3000 | 720 | 720 |
| 9 | 120 | 0 | 720 | 1430 |
| Geometric Mean | | | 370 | 450 |

[a] Samples heat-shocked at 80° C. for 10 min.

TABLE VI

Effect of Sodium Hypophosphite and Sodium Nitrite on Toxin Production by C.botulinum in Bacon. Data for unswollen packages.

| Sample | 0 | 4 | 7 | 10 | 14 | 24 | 35 |
|---|---|---|---|---|---|---|---|
| 1 | 0/1 | 0/4 | ¼ | 2/4 | T | | |
| 2 | 0/1 | 0/4 | 0/4 | 0/4 | T | | |
| 3 | 0/1 | 0/4 | ¼ | ¼ | ¼ | T | |
| 4 | 0/1 | 0/4 | 0/4 | 0/4 | 0/4 | 0/1 | T |
| 5 | 0/1 | 0/4 | 0/4 | 0/4 | ¼ | T | |
| 6 | 0/1 | 0/4 | ¼ | 2/4 | 2/4 | T | |
| 7 | 0/1 | 0/4 | 0/4 | 0/4 | 0/4 | 0/4 | T |
| 8 | 0/1 | 0/4 | 0/4 | 0/4 | 0/4 | 0/4 | 0/1 |
| 9 | 0/1 | 0/4 | 0/4 | 0/4 | 2/4 | T | |

Days at 27° C.

T=Tests for toxicity terminated since all remaining packages had swollen.
Sample contains neither sodium nitrite nor sodium hypophosphite.
Sample 2 contains no sodium nitrite and 500 ppm sodium hypophosphite.
Sample 3 contains no sodium nitrite and 1,000 ppm sodium hypophosphite.
Sample 4 contains no sodium nitrite and 3,000 ppm sodium hypophosphite.
Sample 5 contains 40 ppm sodium nitrite and no sodium hypophosphite.
Sample 6 contains 40 ppm sodium nitrite and 500 ppm sodium hypophosphite.
Sample 7 contains 40 ppm sodium nitrite and 1,000 ppm sodium hypophosphite.
Sample 8 contains 40 ppm sodium nitrite and 3,000 ppm sodium hypophosphite.
Sample 9 contains 120 ppm sodium nitrite and no sodium hypophosphite.

TABLE VII

Effect of Sodium Hypophosphite and Sodium Nitrite on Swell Rates[a] and Toxicity of Bacon Inoculated with Clostridium botulinum

| Sample | 9 | 10 | 12 | 14 | 17 | 21 | 24 | 27 | 29 | 31 | 37 | 49 |
|---|---|---|---|---|---|---|---|---|---|---|---|---|
| 1 | 2[a] (2)[b] | 6 (6) | 19 (18) | 25 (24) | T | | | | | | | |
| 2 | 2 (1) | 9 (8) | 23 (19) | 25 (20) | T | | | | | | | |
| 3 | | | | 2 (1) | 10 (8) | 21 (16) | 24[a] (18)[b] | 25 (18) | T | | | |
| 4 | | | | 4 (0) | 17 (0) | 25 (1) | T | | | | | |
| 5 | | 1 (1) | 10 (7) | 21 (14) | 25 (15) | T | | | | | | |
| 6 | | | | (3) (3) | 17 (14) | 25 (19) | T | | | | | |
| 7 | | | 1 (0) | 1 (0) | 6 (0) | 16 (0) | 17 (0) | 21 (0) | 21 (0) | 25 (0) | T | |
| 8 | | | | 5 (1) | 5 (1) | 12 (4) | 15 (4) | 23 (4) | 24 (4) | 24 (4) | 25 (4) | |
| 9 | | | | | 4 (0) | 13 (4) | 18 (5) | 23 (5) | 25 (5) | T | | |

Days at 27° C.

[a] Cumulative swells.
[b] Cumulative toxic swells.
T All samples in swollen test terminated.

TABLE VIII

Time to First Toxic Sample for Bacon Inoculated with Clostridium botulinum

| Sample | Time to First Toxic Sample (Days) |
|---|---|
| 1 | 7N |
| 2 | 9S |
| 3 | 7N |
| 4 | 17S |
| 5 | 12S |
| 6 | 7N |
| 7 | >37 |
| 8 | 17S |
| 9 | 14N |

N = First Toxic sample was a nonswell.
S = First toxic sample was a swell.

TABLE IX

Effect of Sodium Hypophosphite and Sodium Nitrite on Swell Formation in Uninoculated Bacon[a]

| Sample | 12 | 14 | 17 | 21 | 24 | 29 | 31 | 49 |
|---|---|---|---|---|---|---|---|---|
| 1 | | 10 | T | | | | | |
| 2 | 1 | 9 | 10 | T | | | | |
| 3 | | 3 | 6 | 10 | T | | | |
| 4 | | | 3 | 7 | 8 | 9 | T | |
| 5 | — | 1 | 5 | 9 | 10 | T | | |
| 6 | | 1 | 8 | 8 | 9 | 11 | T | |
| 7 | | 1 | 2 | 4 | 6 | 6 | 8 | 10 |
| 8 | | | 1 | 3 | 8 | 10 | T | |
| 9 | | 1 | 2 | 5 | 6 | 9 | 10 | T |

Days at 27° C.

[a] Cumulative swells.
T All sample swollen and experiment terminated.

We claim:

1. A smoked fish product which inhibits the growth of *Clostridium botulinum* and the production of enterotoxin during storage of said fish product, containing an alkali metal nitrite salt, in an amount less than about 120 ppm, and from about 1,000 ppm to about 3,000 ppm of a compound selected from the group consisting of hypophosphorous acid, sodium hypophosphite, potassium hypophosphite, calcium hypophosphite and manganese hypophosphite.

2. The smoked fish product of claim 1 wherein said compound is hypophosphorous acid.

3. The smoked fish product of claim 1 wherein said compound is potassium hypophosphite.

4. The smoked fish product of claim 1 wherein said compound is sodium hypophosphite.

5. The smoked fish product of claim 1 which contains about 3,000 ppm of sodium hypophosphite.

6. The smoked fish product of claim 5 which also contains sodium nitrite in amounts of from about 40 ppm to less than about 120 ppm.

7. The smoked fish product of claim 6 which contains about 40 ppm of sodium nitrite.

* * * * *

UNITED STATES PATENT AND TRADEMARK OFFICE
CERTIFICATE OF CORRECTION

PATENT NO. : 4,344,977
DATED : August 17, 1982
INVENTOR(S) : John S. Thompson and Joseph F. Jadlocki It is certified that error appears in the above-identified patent and that said Letters Patent are hereby corrected as shown below:

Column 1, line 8, "4,227,507" should read --4,277,507--; line 16, "baloney" should read --bolgna--. Column 2, line 28 "thereto of an effective" should read --thereto an effective--; line 61, "while" should read --While--.

Column 4, line 15, "hypophosphite, added." should read --hypophosphite added.--; line 40, "types B" should read --type B--; line 52 "assay" should read --assaying--.

Column 6, line 7, Table I, footnote, "sodium nor sodium" should read --sodium nitrite nor sodium--; line 31, Table II, footnote, "Sample contains" should read --Sample I contains--. Column 7, Table VI, line 32, footnote, "Sample contains" should read --Sample 1 contains--; Table VII, line 54, Sample 6 under Day 17, "(3)" should read --3--.

Signed and Sealed this

Thirteenth Day of September 1983

[SEAL]

Attest:

GERALD J. MOSSINGHOFF

Attesting Officer

Commissioner of Patents and Trademarks